(No Model.)  5 Sheets—Sheet 1.
F. W. MORGAN.
PNEUMATIC TIRE.
No. 584,289.  Patented June 8, 1897.
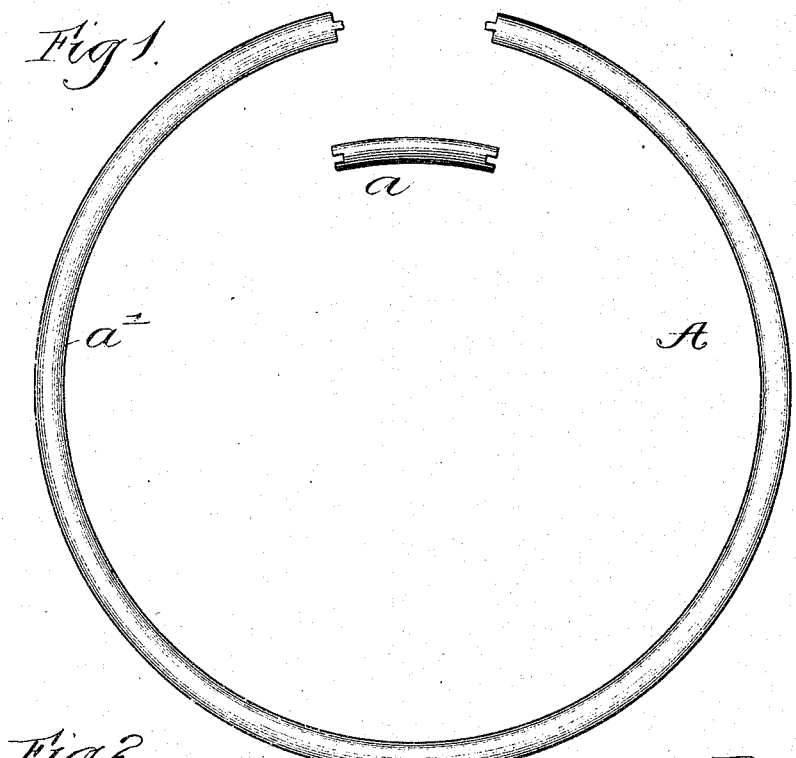
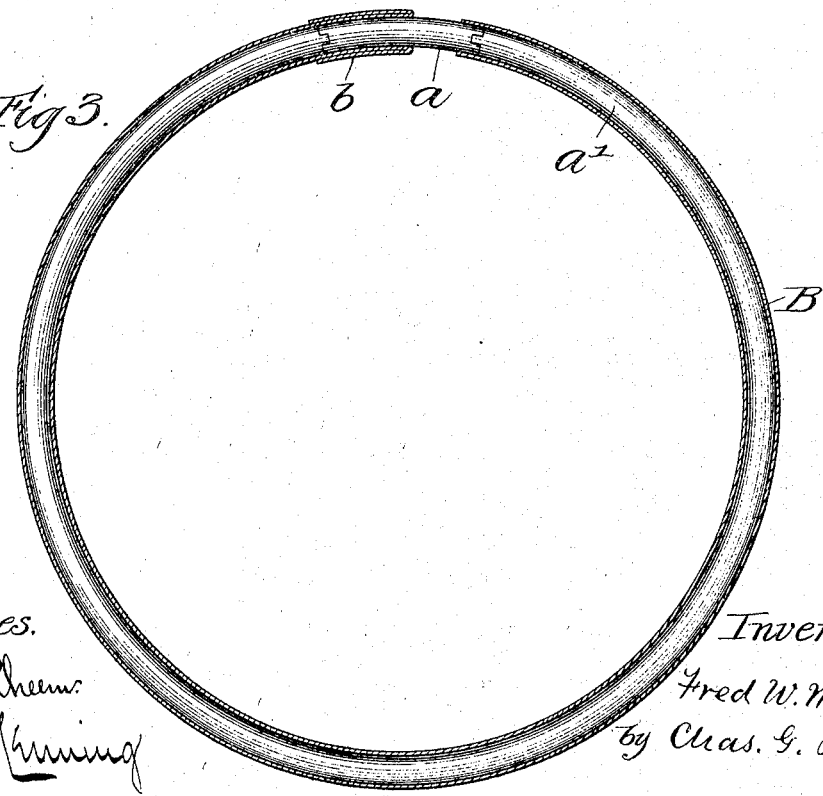
Witnesses.
Inventor
Fred W. Morgan
by Chas. G. Page
Atty.

(No Model.)  5 Sheets—Sheet 2.
F. W. MORGAN.
PNEUMATIC TIRE.
No. 584,289. Patented June 8, 1897.
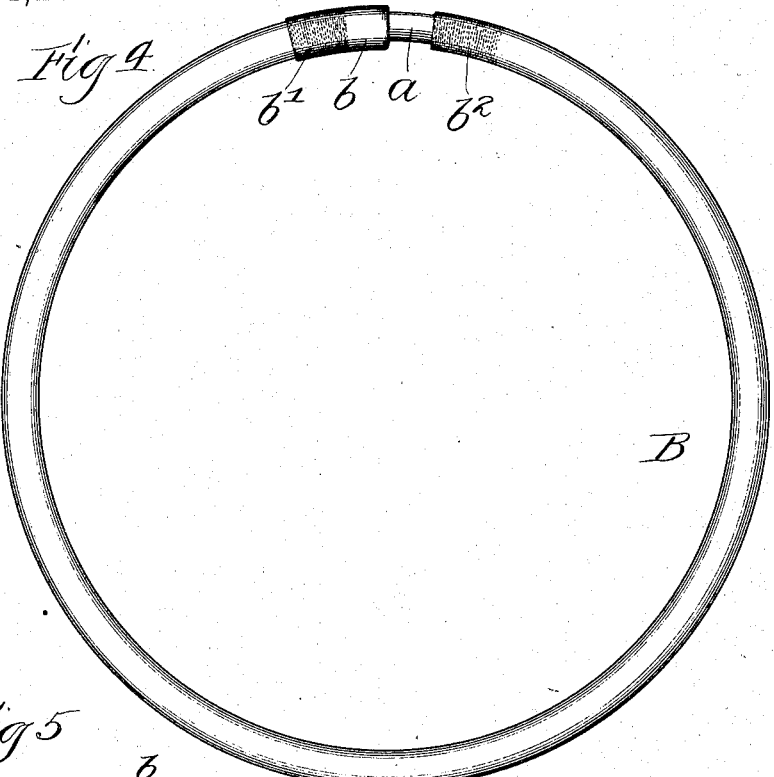
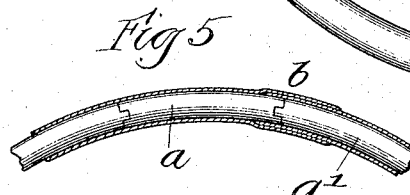
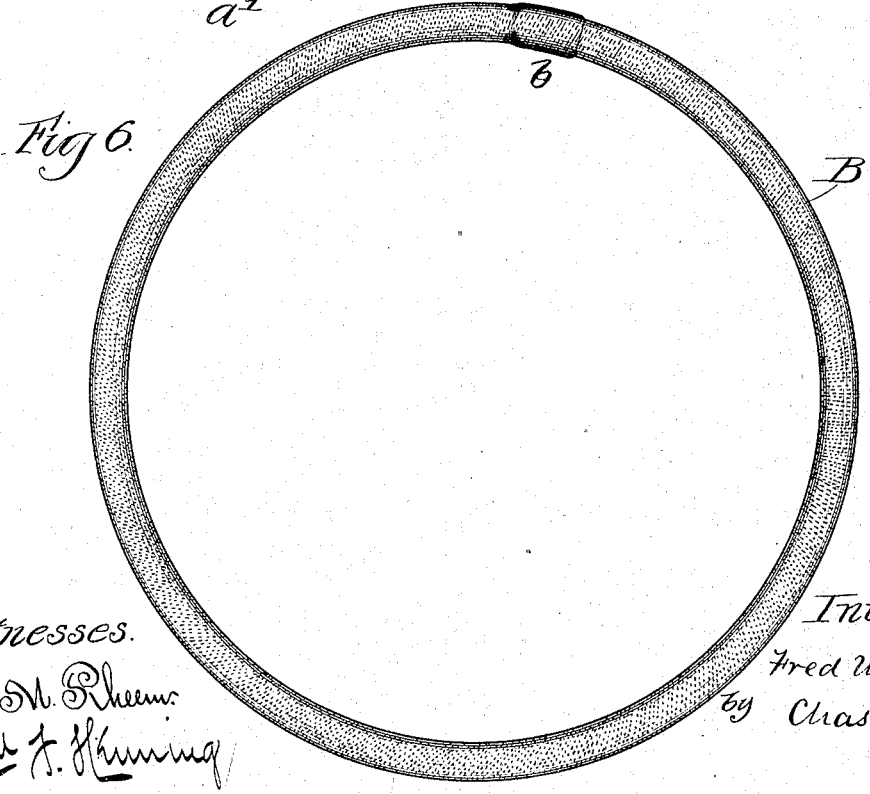
Witnesses.
Inventor
Fred W. Morgan
by Chas. G. Page
Atty.

(No Model.) 5 Sheets—Sheet 3.
F. W. MORGAN.
PNEUMATIC TIRE.
No. 584,289. Patented June 8, 1897.
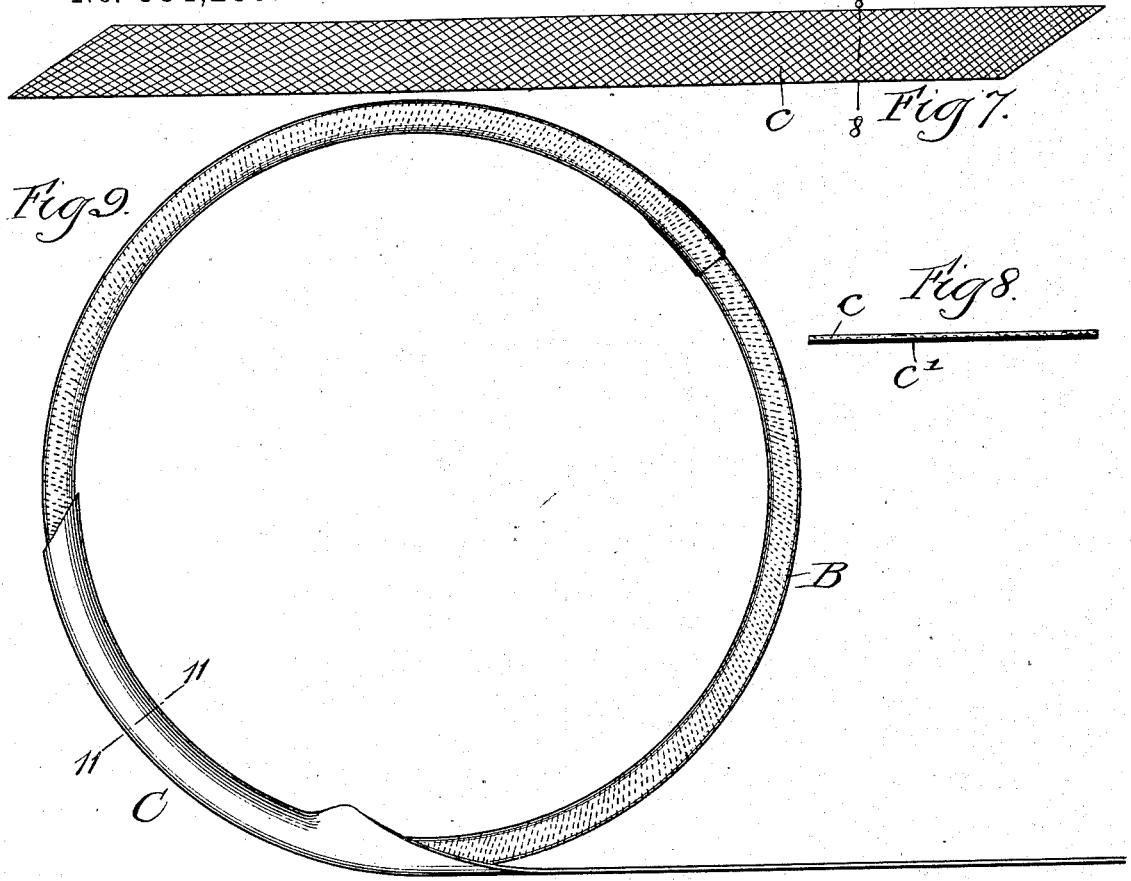

(No Model.) 5 Sheets—Sheet 4.
F. W. MORGAN.
PNEUMATIC TIRE.
No. 584,289. Patented June 8, 1897.
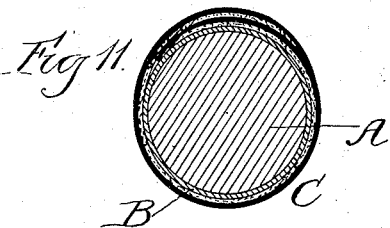
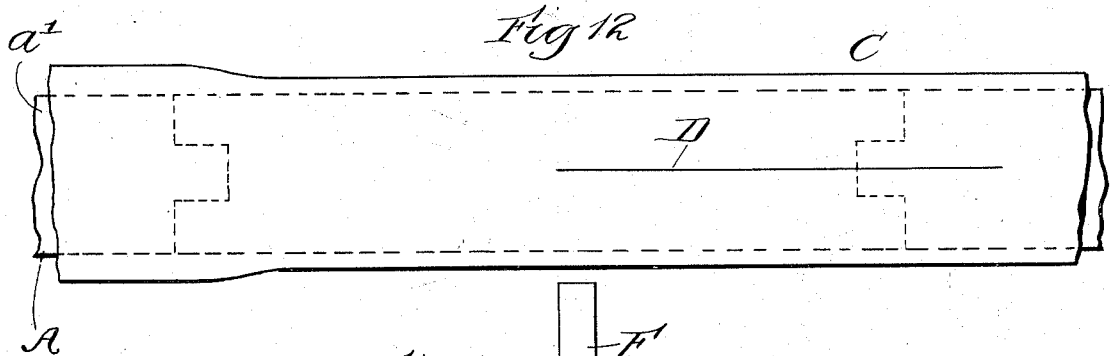
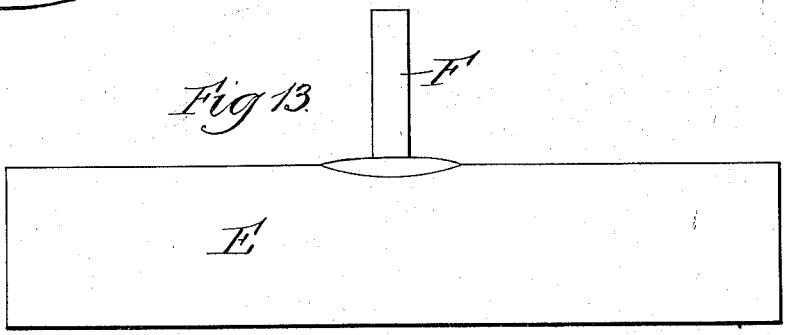
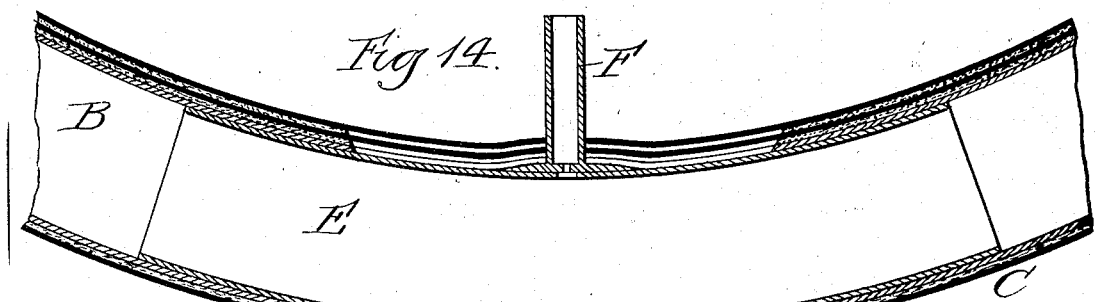
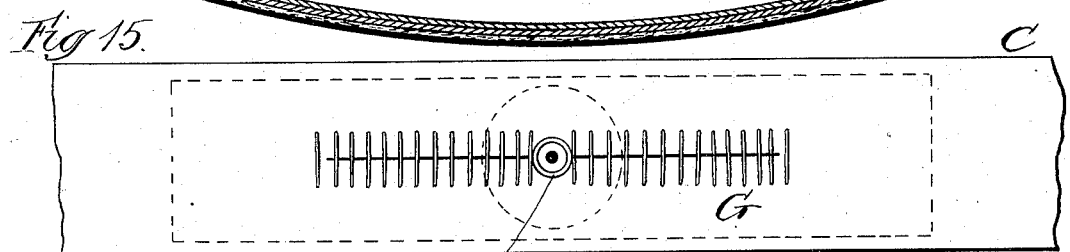
Witnesses.
Inventor
Fred W. Morgan
by Chas. G. Page Atty.

(No Model.)  5 Sheets—Sheet 5.
F. W. MORGAN.
PNEUMATIC TIRE.
No. 584,289. Patented June 8, 1897.
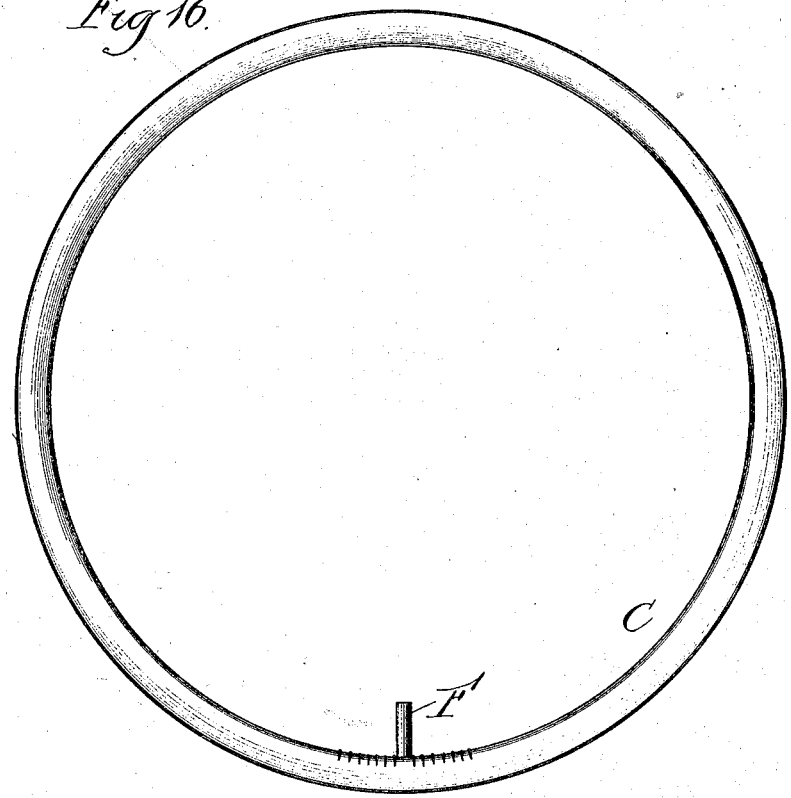
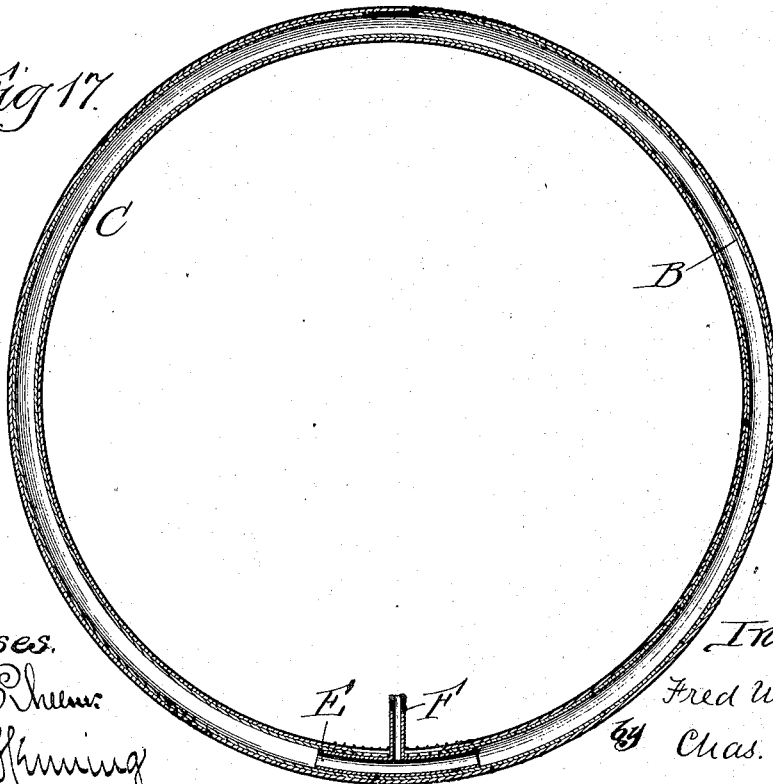
Witnesses.
Inventor
Fred W. Morgan
by Chas. G. Page
Att'y.

UNITED STATES PATENT OFFICE.

FRED W. MORGAN, OF CHICAGO, ILLINOIS, ASSIGNOR TO THE MORGAN & WRIGHT, OF SAME PLACE.

PNEUMATIC TIRE.

SPECIFICATION forming part of Letters Patent No. 584,289, dated June 8, 1897.

Application filed April 30, 1894. Serial No. 509,478. (No model.)

*To all whom it may concern:*

Be it known that I, FRED W. MORGAN, a citizen of the United States, residing at Chicago, in the county of Cook and State of Illinois, have invented a certain new and useful Improvement in Pneumatic Tires, of which the following is a specification.

A prominent object of my invention is to provide a one-tube track or racing pneumatic tire involving the features of durability, effective action, and capability of resisting the leakage of a contained body of compressed air; also to provide a novel and effective mode or process of constructing such tire.

In carrying out my invention I employ a separable mandrel and place thereon a previously-formed air-tube, the mandrel being at such time in an open condition, so as to permit it to receive the air-tube. I then close the mandrel and close the ends of the air-tube, so as to form upon the mandrel an annular endless tube. I then place upon the air-tube an outer covering desirably composed of fabric and rubber and vulcanize the tire thus formed upon the mandrel. After vulcanization I remove the tire from the mandrel, and to such end split or open the tire to a limited extent, so that it can be stripped from the mandrel, which latter leaves or emerges from the tire by way of said split or opening. I then introduce through such split or opening a short tubular section and cause the same to unite with the inner wall of the tire, thereby closing the split and rendering air-tight the tubular annular passage within the tire.

The air-tube could be placed upon the mandrel in an unvulcanized condition, but as a matter of further and special improvement I employ a cured or vulcanized thin rubber air-tube and cover the same with cement preparatory to placing thereon the outer covering. Prominent advantages of thus employing a vulcanized air-tube are, first, a thin unvulcanized tube would be subject to injury and would be more or less difficult to handle and properly manipulate, and, next, by employing a vulcanized air-tube I can test it by blowing it up preparatory to said use, and hence I can in each instance insure the provision of a perfect air-tube, which is to unite with the cover, so as to form an air-tight lining for the same. This union between the vulcanized air-tube and cover or outer sheet is readily attained by covering the air-tube with cement preparatory to placing the cover or outer sheet thereon.

The short closing-tube which is introduced through the split or opening could be unvulcanized, but it is preferably a section of a vulcanized air-tube, and in such case it can be covered with cement, so as to cause it to adhere to the inner wall of the tire. Said short closing-tube is also provided with a valved nipple, and after it has been introduced within the tire a moderate inflation, attained by forcing in air through the valved nipple, will materially aid in causing a distention of the short closing-tube, to the end that it may be suitably pressed against the inner wall of the tire.

In the accompanying drawings, Figure 1 illustrates a separable mandrel in an open condition. Fig. 2 shows a portion of an air-tube. Fig. 3 shows the mandrel in a closed condition with the air-tube thereon and one end portion of the air-tube turned or rolled back, the air-tube being in longitudinal section. Fig. 4 shows in elevation the air-tube on the mandrel and indicates cement applied to the ends of the air-tube. Fig. 5 shows a portion of the mandrel and end portions of the air-tube closed by telescoping. Fig. 6 shows in elevation the air-tube with its ends telescoped and indicates the application of cement. Fig. 7 shows the canvas side of a covering-strip. Fig. 8 is a section on 8 8 in Fig. 7, but on an enlarged scale. Fig. 9 illustrates a mode of applying the covering. Fig. 10 shows the mandrel in elevation and the composite tire-tube thereon in longitudinal section. Fig. 11 is a cross-section through the mandrel and composite tire-tube on a larger scale. Fig. 12 shows a portion of the mandrel and tire-tube and indicates the split or opening. Fig. 13 shows the closing-tube. Fig. 14 is a section through a portion of the tire and also through the closing-tube secured therein. Fig. 15 is a plan of Fig. 14, showing the split laced up. Fig. 16 shows on a smaller scale the completed tire, and Fig. 17 is a section through the same.

It is understood that in certain figures the thickness of the materials employed is exaggerated relatively to the scale on which the figures are made, so as to clearly illustrate the same.

A indicates a sectional or separable mandrel similar to the mandrel described in Letters Patent of the United States No. 490,035, granted to myself and Rufus Wright.

B denotes a thin rubber air-tube preferably of what is commonly termed "pure" rubber and analogous to an air-tube heretofore made separate from and removably confined within a tire-sheath. Any suitable rubber composition or analogous material impervious to air could be used, but I prefer to use the article known as "pure" rubber.

After removing the separable section $a$ from the main portion $a'$ of the mandrel, so as to open the latter, the air-tube B is slipped upon the open mandrel and the end portions of the air-tube are drawn or pushed back upon the end portions of the mandrel, so as to permit the removable section $a$ to be replaced, as in Fig. 3. The ends of the air-tube are then closed, so as to provide upon the mandrel an endless tube adapted to provide an air-tight lining.

As a simple and effective way of closing the air-tube one end portion of the same can be turned back upon itself, as at $b$, Figs. 3 and 4, whereby after applying cement to a suitable extent upon said portion $b$, as indicated by dotted lines at $b'$, Fig. 4, and also to the opposing end of the air-tube, as indicated by dotted lines at $b^2$ in said figure, the end portion $b$ can be turned forward or unrolled so as to lap upon or telescope with the opposing end of the air-tube, as in Fig. 6, and thereby close the gap between said two ends and also cause a union between the same, it being understood that after having replaced the mandrel-section $a$, as aforesaid, the previously-pushed back ends of the air-tube can be pushed forward preparatory to rolling or turning back one of said ends. It will also be seen that by thus turning back one of the ends of the air-tube a portion of the inner side of such end can be coated with cement, whereby when said end is unrolled its cemented inner side will surround and unite with the outer side of the opposing end of the tube.

Other ways of closing the ends of the tube upon the mandrel can, however, be employed, the end or result in each instance being that the ends of the air-tube are united. Thus, for example, the tube can be of a length to permit its ends to be caused to meet or lie opposite one another after closing the mandrel, and the joint at such point can be closed by a thin rubber strip wrapped about the two opposing ends of the tube, or a short section of thin rubber tubing could be slipped back upon one end portion of the main tube and be subsequently slipped forward over the aforesaid joint and cemented to the opposing end portions of the main tube. In all of such arrangements, however, the result is a closing of the ends of the air-tube upon the closed mandrel, whether such ends are directly or indirectly united; but in practice the mode of simply rolling back one end portion of the air-tube, then applying cement, and then telescoping the ends by unrolling said end portion of the air-tube is preferable. With regard, however, to this portion of my invention, it is distinctly understood that I desire to broadly cover the feature of uniting the ends of the air-tube, whether said union is direct between said ends or made through the intervention of a separate tubular section or a wrapping-piece.

It is also understood that for the broader purposes of my invention the air-tube could be applied upon the mandrel in an unvulcanized condition, in which case it would be vulcanized later on. I have found, however, by repeated experiments that to apply the air-tube in a vulcanized condition involves various positive advantages and serves to produce a superior article. Thus the vulcanized tube is not subject to the injury to which an unvulcanized tube is liable, and by using a vulcanized tube it can be blown up and thoroughly tested preparatory to use, thereby permitting me to use none but perfect tubes. Hence I regard such application of a vulcanized air-tube as a matter of further and special improvement, it being understood that the use of cement, as aforesaid, is particularly applicable to such an air-tube.

The ends of the air-tube being united a thin endless tubular layer of rubber is thereby provided upon the closed mandrel, as in Fig. 6, which said layer is to form a tire-lining impervious to air, as hereinafter set forth. Cement is then applied upon the air-tube, as in Fig. 6, in which the dotted lines indicate the presence of such a coating of cement. The cover or outer sheet C is then applied to the said air-tube, as indicated in Fig. 9, in which a simple mode of applying the covering is illustrated.

The preferred covering consists of an inner layer $c$ of cloth or canvas and a thin layer or stratum $c'$ of unvulcanized rubber, as best shown in Fig. 8, although other plies or suitable layers can be used.

The canvas can be first applied upon the air-tube, and the rubber can then be applied upon the canvas; but, as a more desirable arrangement, the canvas and rubber are prepared or united to form a rubber-coated fabric, as in Figs. 7 and 8. The layer of rubber can be quite thin, and in practice I have used a rubber layer or stratum even as thin as one sixty-fourth of an inch. The thickness of such layer may be increased, but it is desirable that it shall be comparatively thin, so as to produce a good and light track or racing tire.

The strip illustrated by Figs. 7 and 8 is desirably of a width to permit its longitudinal edges to lap along the base of the tire.

When said strip is applied, it will adhere to the cement-covered air-tube. After thus applying the covering or outer composite layer of fabric and rubber the whole is molded and vulcanized. A two-part mold could be used, but where the outer layer of rubber is thin and employed more as a thin outer coating for the canvas or other fabric various disadvanages are attendant upon the use of such a mold, and hence I prefer to wrap the structure with fabric or the like, which takes the place of a two-part mold, and to then vulcanize the article. The said article or tire is then split, as at D, Fig. 12, along its base or other desired portion to a limited extent, and the movable mandrel-section is then removed through such split. The mandrel is also caused to part from the tire by way of said split, and this can be done as described in the aforesaid patents, in which the sheath for receiving a separate air-tube is built upon a sectional mandrel and subsequent split to a limited extent to allow the sheath to be removed.

After the removal of the within-described tire from the mandrel I have a one-tube tire, practically seamless and endless, but having a limited split or opening. This split or opening is then closed by a short tubular section E, of air-tubing, having a valved nipple F. The short tube E, which is preferably a section or short length of air-tubing, is externally coated with cement and is introduced within the tubular tire by way of the split or opening D. By then moderately inflating the tire and pressing it by a rolling or kneading action the tube E will be caused to adhere to the inner wall of the tire. With such arrangement the nipple can project through the split, as in Fig. 14, and the tire can then be suitably fastened along the split, for example, by lacing G, as in Fig. 15. The nipple is understood to be suitably valved, and as any ordinary or suitable valve can be employed no illustration of the valve is made.

The short closing-tube E could be made of unvulcanized rubber, but I prefer using a vulcanized tube on account of its greater strength. The cement employed causes a union between the short closing-tube and the inner wall of the tire, and when the tire is inflated the internal pressure will also serve to press the closing-tube against the inner wall of the tire and thereby effectively guard against separation. The fact that the closing-tube fits within the tire and the further fact that it normally preserves a tubular form render it an exceedingly effective closing device and also permits it to be readily and easily applied. It also affords a support for the nipple, and being of a suitable length renders leakage an impracticable matter.

With reference to the separable mandrel I prefer employing the mandrel shown in said Letters Patent No. 490,035. It is understood, however, that I may use any analogous separable mandrel—for example, one in which the section $a$ is hinged at one end, as shown in Letters Patent of the United States No. 496,321, granted to myself and Rufus Wright, or one in which the feature of separability is attained by transversely dividing the annular mandrel, so that while its ends shall normally abut either or both ends can be temporarily deflected to one side for the purpose of putting on the tube and for the further purpose of removing the tire after forming through the latter a suitable split, as aforesaid, it being observed that with the last-mentioned arrangement it would be difficult to spring apart the ends of a large steel mandrel, and that other material, such as compacted cotton duck or other suitable springy material, should be used for forming the mandrel. I regard, however, a metal mandrel as the best.

What I claim as my invention is—

The within-described improvement in the art of forming pneumatic tires, consisting essentially in the following steps, to wit: forming and vulcanizing a thin rubber tube; drawing such tube upon an annular, separable mandrel adapted to the bore of a pneumatic tire; closing the separable mandrel; connecting the ends of the thin rubber tube so as to render it continuous; forming and cementing upon the thin rubber tube thus arranged an endless, seamless covering of rubber and fibrous material, and vulcanizing the latter by a separate vulcanization; opening the combined thin rubber tube and covering to a limited extent; opening the mandrel and causing the combined thin rubber tube and mandrel to part from one another by way of such limited opening; and hermetically closing such opening.

FRED W. MORGAN.

Witnesses:
CHARLES G. PAGE,
R. M. ELLIOTT.